United States Patent [19]
Fujii et al.

[11] Patent Number: 5,752,256
[45] Date of Patent: May 12, 1998

[54] DISK ARRAY APPARATUS AND METHOD FOR DIVIDING AND READING/WRITING PARTIAL DATA ACROSS A PLURALITY OF DRIVE GROUPS UTILIZING PARALLEL PROCESSING

[75] Inventors: Hiroaki Fujii, Hadano; Hitoshi Kakuta, Tokyo; Yoshifumi Takamoto, Fuchu, all of Japan

[73] Assignee: Hitachi, Ltd., Tokyo, Japan

[21] Appl. No.: 250,446

[22] Filed: May 27, 1994

[30] Foreign Application Priority Data

May 27, 1993 [JP] Japan .................................. 5-125778

[51] Int. Cl.$^6$ ................................................ G06F 13/00
[52] U.S. Cl. .......................... 711/114; 711/168; 395/840
[58] Field of Search ............................ 395/441, 182.04, 395/182.05, 495, 496, 840, 841, 827

[56] References Cited

U.S. PATENT DOCUMENTS

| | | | |
|---|---|---|---|
| 4,989,206 | 1/1991 | Dunphy, Jr. et al. | 395/182.05 |
| 5,077,736 | 12/1991 | Dunphy, Jr. et al. | 395/182.05 |
| 5,124,987 | 6/1992 | Milligan et al. | 395/182.05 |
| 5,457,703 | 10/1995 | Kakuta et al. | 371/40.4 |

OTHER PUBLICATIONS

"A Case For Redundant Arrays of Inexpensive Disks (RAID)", pp. 109–116 David Patterson et al., ACM SIGMOD Conference (1988 Jun.).

*Primary Examiner*—Glenn Gossage
*Attorney, Agent, or Firm*—Antonelli, Terry, Stout, & Kraus, LLP

[57] ABSTRACT

A disk apparatus including a disk controller connected to a plurality of drives, each having a plurality of memory disks, and an access method to the disk apparatus, are described. Accordingly, a plurality of drives are grouped into a plurality of drive groups, and a data set is divided into a plurality of partial data having a data quantity that is accessible at a given time by each of the drive groups when an access request is generated from an external apparatus to the disk apparatus. Partial data are written into the different drive groups at different times, and successive partial data are written into different drive groups. The plurality of partial data may be transferred to the drive groups in parallel with the writing of partial data into the memory disks.

10 Claims, 20 Drawing Sheets

- LAdr : LOGICAL ADDRESS FOR DISK APPARATUS
- DG# : DRIVE GROUP NUMBER
- D.Adr : ADDRESS OF INSIDE DRIVE GROUP
- C : CACHING BIT
- C.ADr : ADDRESS AT INSIDE CACHE
- Link : NEXT ENTRY INDICATION POINTER

DG# : DRIVE GROUP NUMBER

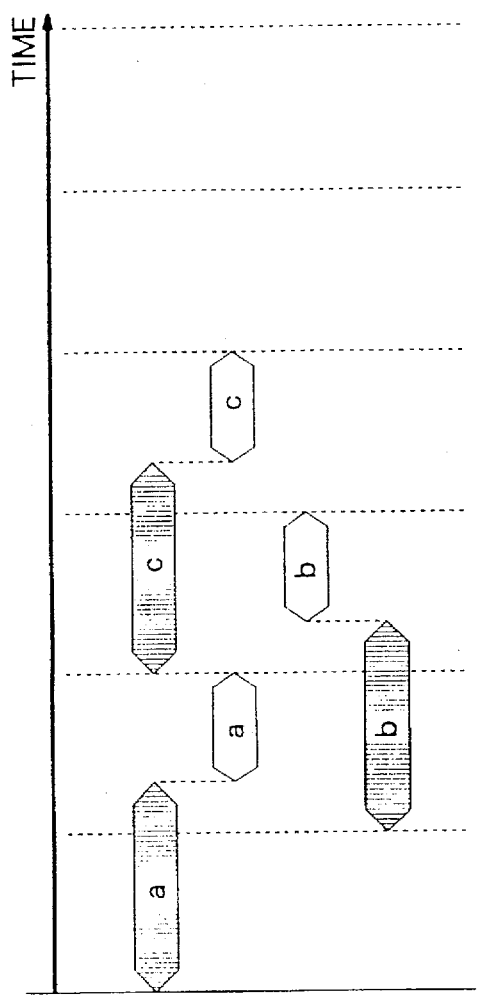
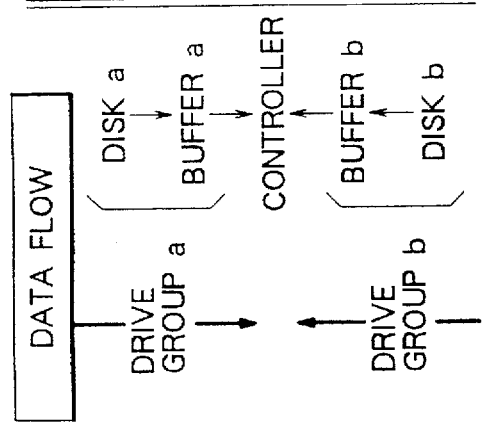
FIG. 9A
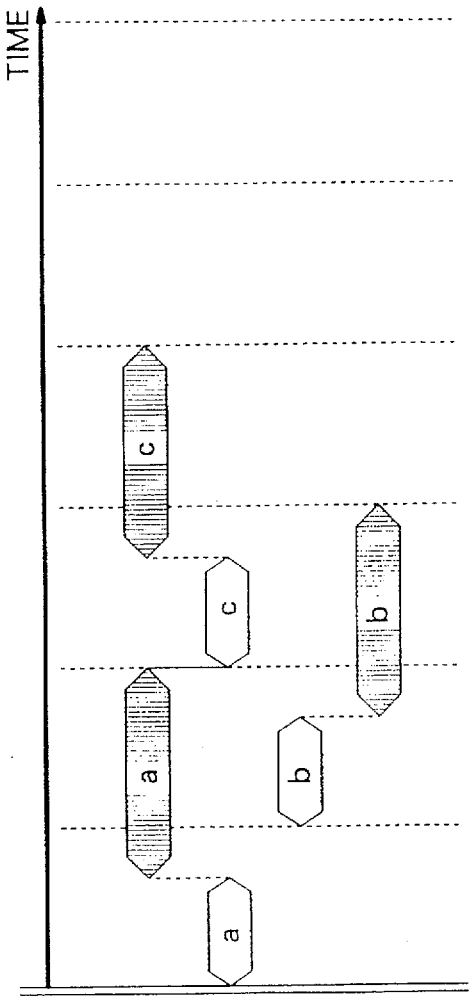
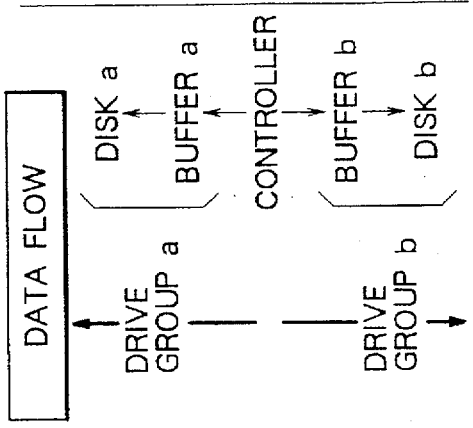
FIG. 9B 1016, 1017

DISK ARRAY APPARATUS AND METHOD FOR DIVIDING AND READING/WRITING PARTIAL DATA ACROSS A PLURALITY OF DRIVE GROUPS UTILIZING PARALLEL PROCESSING

BACKGROUND OF THE INVENTION

This invention generally relates to a memory apparatus used in a computer system. More particularly, it relates to a disk apparatus for particularly accomplishing input/output operations with high efficiency, and a disk control method for the disk apparatus.

In existing computer systems, data required by high order apparatuses or host apparatuses such as a CPU (Central Processing Unit) are stored in a secondary memory device, and the CPU generates a request to the secondary memory device in accordance with necessity for processing by the CPU, and executes data write processing or data read processing. Generally, a nonvolatile memory medium is used as the secondary memory device. A magnetic disk apparatus, an optical disk apparatus, etc., are typical examples of such a nonvolatile memory medium.

Higher performance has been required for secondary memory units in a computer system with the recent trend towards information network systems. One of the possible solutions is a disk array which constitutes a disk system comprising a plurality of drives having a relatively small memory capacity. The term "drive" represents a basic unit constituting a disk apparatus, and employs a construction shown in FIG. 15.

The disk array is described in the report entitled "A Case for Redundant Arrays of Inexpensive Disks (RAID)" by D. Patterson, G. Gibson and R. H. Kartz in ACM SIGMOD (Association for Computing Machinery; Special Interest Group on Management of Data), Conference (1988, June). The disk array improves access through-put by operating a plurality of drives simultaneously for one disk access.

Both ordinary disk apparatuses and disk arrays are generally constituted at present by drives having an Small Computer System Interface (SCSI) interface. A disk controller exists between the drives and a high order side (host) apparatus such as a CPU. A disk access request from the CPU is transmitted to the disk controller, and the disk controller generates a command to the drives in accordance with the access request.

When the drive receives the command from the disk controller at the time of generation of the disk access, it moves a read/write head to a suitable track of the disk in which data exists or into which the data is to be written (seek operation) and enters a stand-by state while rotating the disk until the disk position to be read or written is positioned at the head so that the data read/write operation becomes possible.

This processing is executed on the basis of the SCSI interface in the form shown in FIG. 16 (SCSI command processing). By the way, SCSI is stipulated as ANSI X3.131-1986.

The mode of processing of the access to a conventional disk apparatus is illustrated by a time chart in FIGS. 17A and 17B. FIG. 17A shows a read access and FIG. 17B shows a write access. The flow in a longitudinal direction of the time chart represents a data flow inside the disk apparatus, and a disk and a buffer correspond to reference numerals 1501 and 1506 in FIG. 15, respectively. Symbols a, b and c in each time chart represent continuous unit accesses inside the disk apparatus, respectively. A processing time for each unit access includes a processing time associated with the SCSI interface described above.

As can be clearly understood from FIGS. 17A and 17B, continuous accesses are sequentially processed for both read access/write access in the prior art system.

As described above, since the continuous accesses are sequentially processed for both read access/write access in the prior disk apparatus, the problems remain unsolved that a data input/output quantity per unit time (access through-put) is insufficient and an access reception interval (the access pitch or period between the start of access "a" and the start of access "b") is elongated.

Although the conventional disk array apparatus can improve access through-put, the problem on the access pitch remains yet to be solved.

SUMMARY OF THE INVENTION

It is an object of the present invention to improve performance of a disk apparatus by accomplishing the reduction of an access pitch by utilizing hardware but not to increase a burden to a software with a disk access.

The disk apparatus according to the present invention is equipped with a plurality of drives, these drives are grouped into a plurality of drive groups, a data set for one write access from a high order (host) apparatus is segmented into a plurality of data sets, and these segmented data sets are allocated to mutually different drive groups to conduct the write operation.

According to an embodiment of the present invention, a disk apparatus is provided with a plurality of drive groups each comprising one or a plurality of drives which allocate unit accesses to the drive groups, respectively, and this accomplishes parallel processing of a plurality of unit accesses, so that an access pitch of these access units can be made shorter than the access pitch of the prior art system.

According to another embodiment of the present invention, a disk access to elongated data can be efficiently processed by access controlling means for providing hardware for segmenting this disk access into a plurality of the unit accesses described above and replacing it by the continuous unit accesses when the disk apparatus accepts a disk access request to the elongated data having a data quantity which one drive group cannot process at one time.

According to another embodiment of the present invention, the disk apparatus described above is further provided with a plurality of access ports, and simultaneously processes disk accesses from a plurality of high order apparatuses by the access controlling means described above which allocates each of the unit accesses generated from the disk accesses from a plurality of the high order apparatuses to each of the drive groups and executes parallel processing of the unit accesses.

In the description which follows, the data quantity which one drive group can process at one time will be defined as a "drive group access unit" in the disk apparatus. The data quantity handled by the unit access is determined by the sum of the cylinder size of each drive in the drive group, for example.

Because a plurality of drive groups are disposed in the present invention, the access destination can be distributed and parallel processing for continuous accesses can be made. As a result, the present invention can accomplish efficient disk access. When an access relating to one elongated data is requested for the disk apparatus in the present invention, the access is automatically segmented into unit accesses a, b and c, and these unit accesses are allocated to the drive groups, respectively. Accordingly, efficient processing can be attained. Furthermore, when the degree of multiplexity of access processing is optimally set by increasing the number of drive groups, a disk apparatus having a shorter access pitch can be constituted.

The disk apparatus according to the present invention distributes the access requests from a plurality of high order apparatuses into a plurality of drive groups and processes them. Accordingly, simultaneous processing of the access requests from a plurality of high order apparatuses can be accomplished, and efficient processing can be expected.

Incidentally, allocation of the unit accesses to the drive groups can be accomplished by a method according to which a portion performing the function of access allocation decides in every predetermined interval access timing by time division control. When access allocation is attained by such a synchronous control system using a clock, its control circuit may be simple. Access control by the synchronous control system can reduce the quantities of necessary hardware in comparison with a system which always monitors the conditions of the drive groups and executes access control (hereinafter referred to as an "asynchronous control system"). The asynchronous control system must establish arbitration between the drive groups that operate independently of one another.

BRIEF DESCRIPTION OF THE DRAWINGS

FIGS. 9A and 9B are time charts showing the mode of access processing by the disk apparatus according to the embodiment of the present invention shown in FIG. 1;

DESCRIPTION OF THE PREFERRED EMBODIMENTS

[Embodiment 1]

Figure 1:
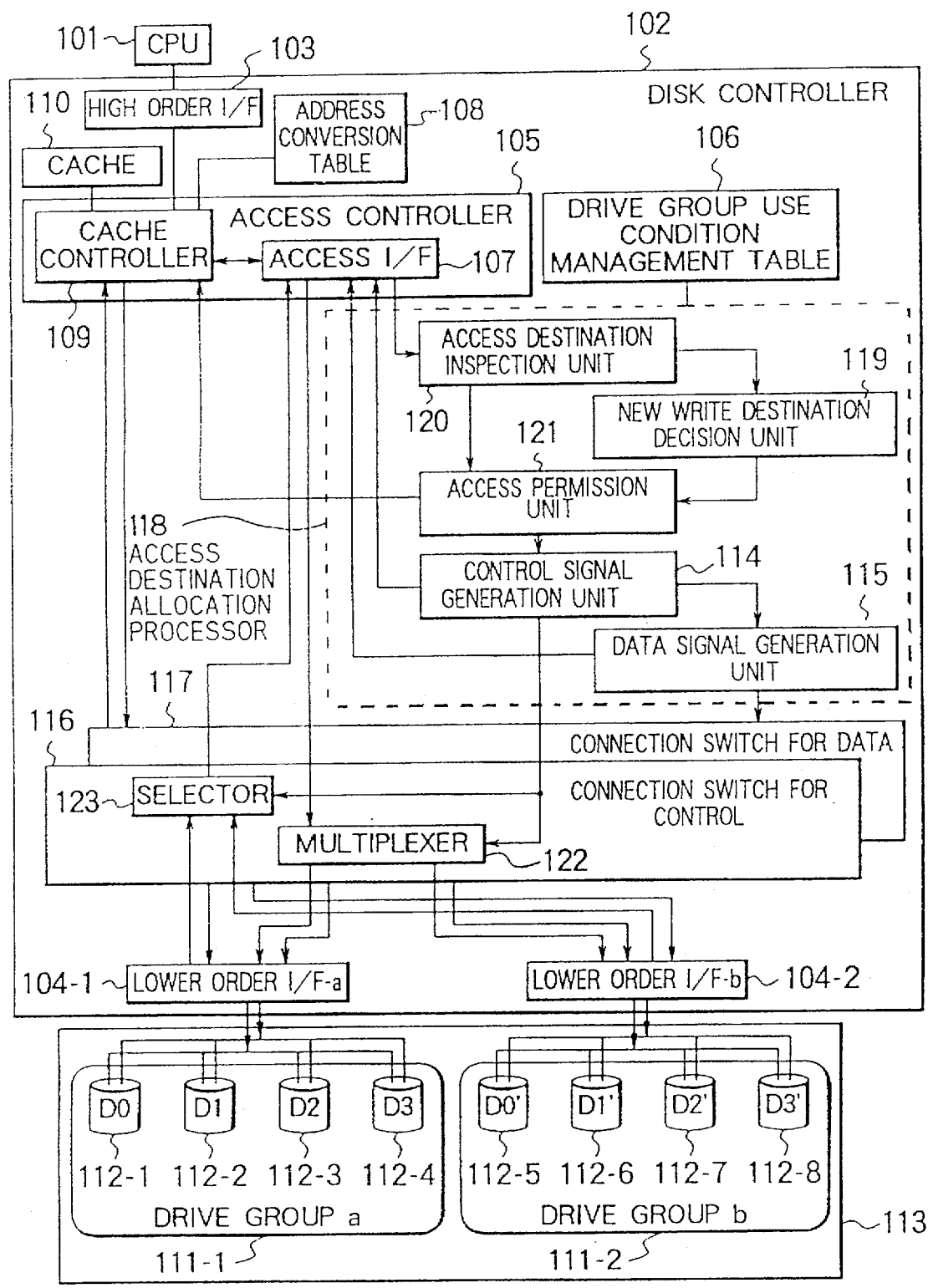
FIG. 1 is a structural view of a disk apparatus according to an embodiment of the present invention.

(1) Apparatus construction:

The construction of a disk apparatus according to an embodiment of the present invention will be explained with reference to FIG. 1. Broadly divided, the disk apparatus of this embodiment comprises a disk controller 102 and drive group 113 consisting of a large number of drives 112. The disk controller 102 is connected to a CPU 101 as a host apparatus, accepts a disk access request from this CPU 101 and accomplishes a processing for this access request by controlling various constituent elements of the disk apparatus.

In the present invention, a large number of drives 112-1 to 112-8 constituting the drive group 113 gather together and constitute a plurality of drive groups 111-1 and 111-2. These drive groups 111-1, 111-2 are drive groups which become an access object of a single unit access inside of the disk apparatus. The disk apparatus according to the present invention allocates the continuous unit accesses to sequentially different drive groups 111-1, 111-2. Allocation of access destinations of the unit accesses is accomplished by an access destination allocation processor 118.

(1-1) Construction of drive group 113:

The drive group 113 comprises a plurality of drive groups 111. FIG. 1 shows an example of a disk apparatus having two drive groups 111.

Each drive group 111 comprises one or a plurality of drives 112. Each drive group 111 comprises a plurality of drives 112 in order to improve access through-put per that drive group 111. A plurality of drives inside each the drive group 111 may constitute a RAID. The technology based on the present invention does not particularly stipulate the construction inside the drive group 111. Each drive group 111 has input/output lines, for data and control, to the disk controller 102.

Figure 15:
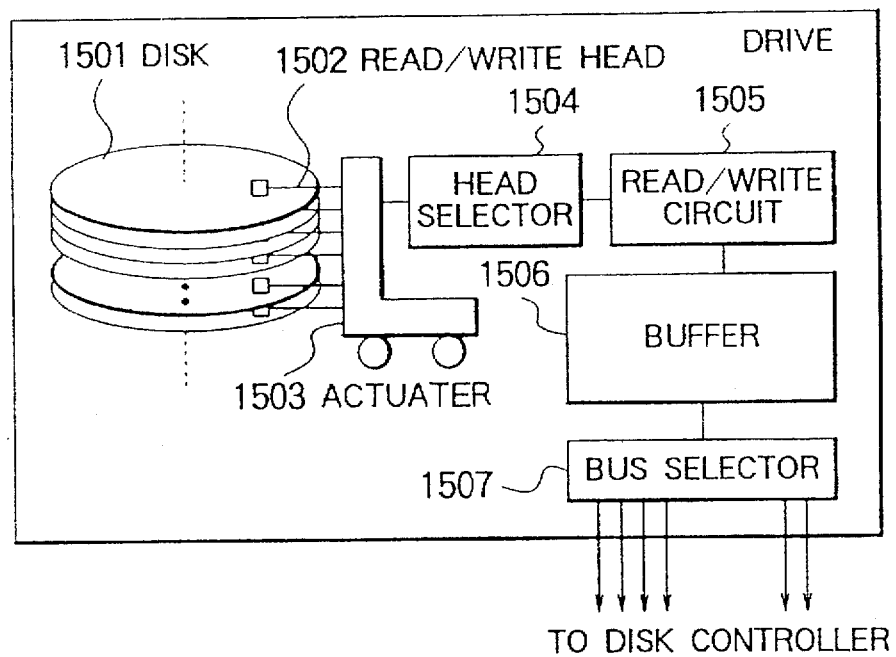
FIG. 15 is a structural view of a drive in a disk apparatus to which the present invention can be applied.

FIG. 15 shows the construction of the drive 112. A drive 112 used in a disk apparatus according to the prior art can also be used as the drive 112 used in the disk apparatus according to the present invention. The drive 112 comprises a plurality of disks 1501 as a data storage medium, a plurality of read/write heads 1502 for reading or writing data from/to the disks 1501, an actuator 1503 for operating the read/write heads 1502, a head selector 1504 for selecting the read/write heads 1502 which are to be operated, a read/write circuit 1505 for controlling read/write from and to the disks, a buffer 1506 for temporarily holding write data from the disk or read data from the disk, a bus or path selector 1507 for selecting paths from the drives 112 to the disk controller 102, and so forth.

The fundamental operation of the drive 112 for the read/write access is the same as that of the prior art technology. The operation inside the drive, when the disk access is generated, will be explained with reference to FIG. 15. First, when the drive receives a data read/write command from the controller, the path selector 1507 selects the path, and the read/write head 1502 is moved to a suitable track of the disk 1501 at which data exists or to which the data is to be written (seek operation). The disk 1501 is kept rotating and under a stand-by state until read/write of the data becomes possible. Such a period in a stand-by state is called latency. In the case of the read access, the head selector 1504 selects the read/write heads 1502 and then the data is read from the read/write circuit 1505 to the buffer 1506. The data in the buffer 1506 is then transferred to the disk controller through the path selected by the path selector 1507. In the case of the write access, on the other hand, the data transferred from the disk controller is temporarily stored in the buffer 1506 and after the latency of the disk 1501, the data is written into the disk 1501.

Figure 16:
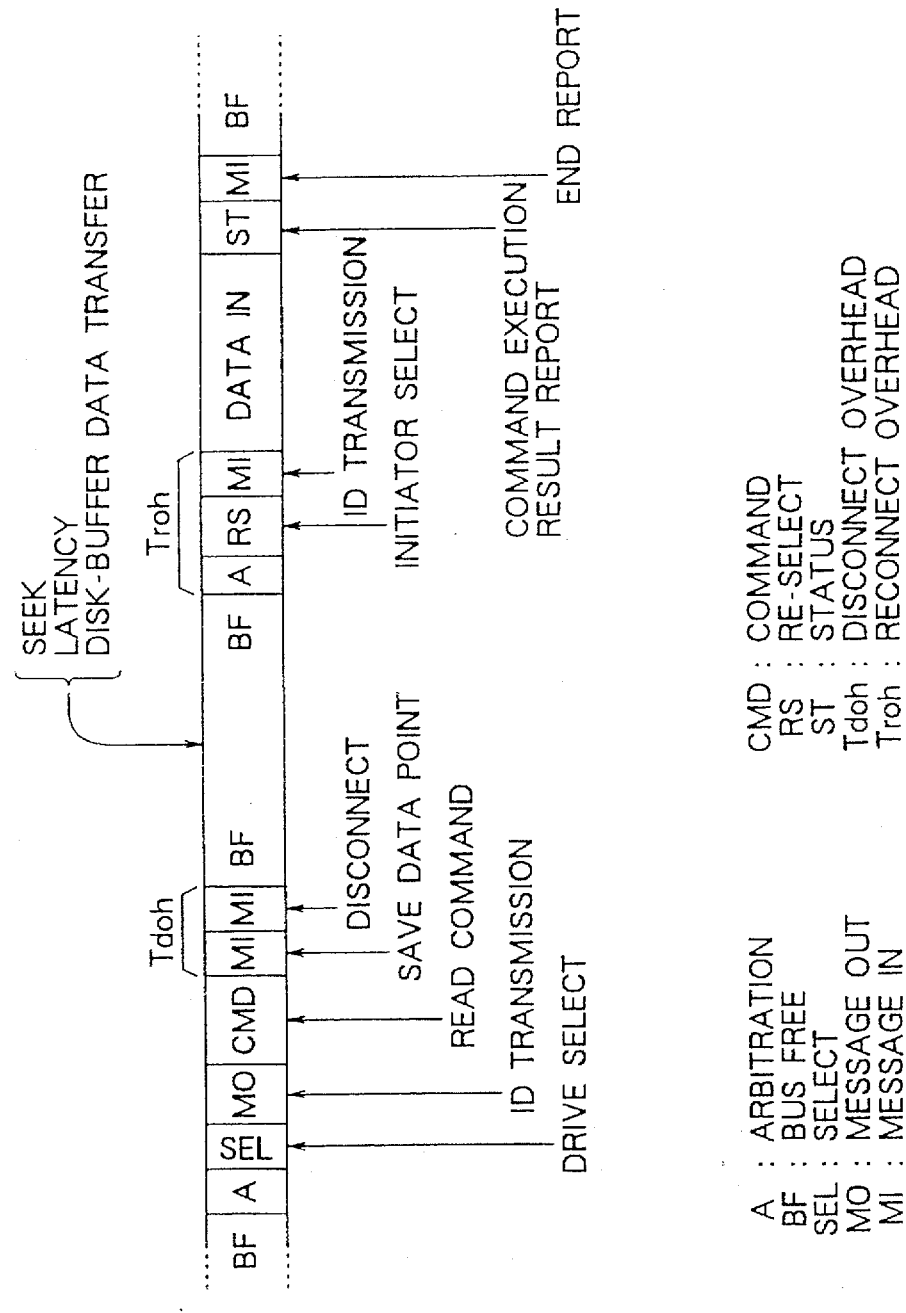
FIG. 16 is a diagram showing command processing on the basis of an SCSI interface.

The processing described above is executed on the basis of a SCSI interface in the form shown in FIG. 16 (SCSI command processing). In this SCSI command processing, the disk controller first executes arbitration of the SCSI bus, selects a target drive, and sends an ID (address) to the selected drive. The drive, which receives the ID, accepts a read command, for example, stores processing information inside the controller in the drive, and releases the connection from the disk controller. After the connection is released, the disk controller and the SCSI bus can be used for the access to other drives. The drive released from the connection effects Seek and latency, and the data is transferred from the disk 1501 to the buffer 1506. When data write to the buffer 1506 is completed, the drive again requests arbitration of the SCSI bus for the disk controller. After arbitration is completed by the disk controller, the drive selects the disk controller and transfers the ID relating to the data on the buffer 1506 to the disk controller. When the ID is matched with the request of the disk controller, the data is transferred to the disk controller. After the transfer of the data is completed, a command execution result report and an end report are given from the drive to the disk controller. The above explains an example of a series of processings of the SCSI command.

(1-2) Construction of disk controller 102:

The disk controller 102 includes a high order interface (I/F) 103 for receiving control and data input/output lines from the CPU 101 and the same number of low order I/Fs 104 as the number of the drive groups 111, which receive the control and data input/output lines from each of a plurality of drive groups 111 and correspond to the drive groups 111 on a 1:1 basis. These high order I/F 103 and the low order I/Fs 104 are the same as those employed in the disk controller of the disk apparatus according to the prior art with the exception that a plurality of low order I/Fs 104 exist.

The disk controller 102 includes also a cache 110 between the high order I/F 103 and the low order I/Fs 104. The cache 110 is used as a temporary storage of the write data and the read data. When a desired data exists on the cache 110 at the time of read access, it is not necessary to read the data up to the drive 112, and a high speed read access can be accomplished. In the write access, too, a high speed data acceptance can be accomplished because the data is accepted by the cache. Consequently, data reception can be accomplished at a high speed, and the CPU can be relieved at an early stage from the disk access. Further, when elongated data from the host apparatus is received by this cache 110, a processing which divides the data into several data segments, generates a unit access for each of the resulting data segments and writes them into the drives (drive groups) can be accomplished. The cache 110 is controlled by the cache controller 109.

The cache controller 109 is included in the access controller 105 along with the access I/F 107. Whereas the cache controller 109 mainly handles data flow inside the disk controller 102 such as control of the cache, the access I/F 107 handles a control flow inside the disk controller 102.

The disk controller 102 further includes the access destination allocation processor 118 and connection switches 116, 117 for control and for data, respectively, which are controlled by the processor 118.

The access destination allocation processor 118 comprises an access destination inspection unit 120 for inspecting access request destination information from the access I/F 107, a new write destination decision unit 119 for deciding a new write destination drive group 111, an access permission unit 121 for inspecting whether or not the requested access destination is accessible, a control signal generation unit 114 for generating a signal for controlling the connection switch 116 for control, a data signal generation unit 115 for generating a signal for controlling connection switch 117 for data and a drive group use condition management table 106.

Figure 7:
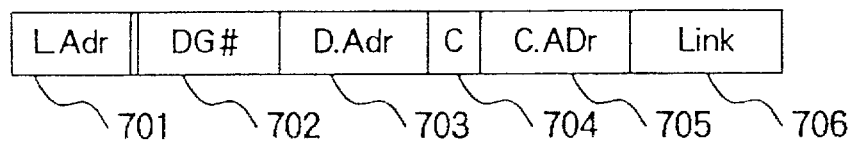
FIG. 7 is a table showing an entry constituting an address conversion table of the disk apparatus according to the embodiment of the present invention.

The disk controller 102 allocates a plurality of unit accesses to a plurality of drive groups 111-1, 111-2. Accordingly, the data on this disk apparatus is distributed to a plurality of drive groups 111-1, 111-2. To grasp the addresses of these distributed data, the disk controller 102 has an address conversion table 108. The address conversion table 108 is looked up by the cache controller 109. The table 108 is constituted by entries shown in FIG. 7, for example, and a logical address 701 for a disk apparatus, and a physical address corresponding to the address 701, expressed by a set of a drive group number 702 and an address 703 inside the drive group registered as a set. When the drive group 111 constitutes a RAID, the address 703 inside that drive group is expressed by a set of the drive number and the address inside the drive, in accordance with the prior art technology. Further, this entry has a field for each of caching bit 704 and an address 705 inside the cache. The caching bit 704 represents whether or not the data corresponding to the logical address 701 for the disk apparatus, which is registered to the entry, exists in the cache 110. When this data exists in the cache 110, the address inside this cache 110 is represented by the address 705 inside the cache. An elongated data is divided into several data segments and these data segments are distributed in the disk apparatus. Accordingly, there are a plurality of address conversion table entries corresponding to one elongated data. A link field 706 is provided to the address conversion table entries so as to manage a plurality of these entries and their sequence relationship. The link field 706 represents the number of the entry next to itself in the division unit of a series of elongated data. Incidentally, the value of the link field 706 corresponding to the last division unit in the sequence relationship is NULL. Even when an access is made to the elongated data, the access becomes possible in all the division units by tracing this link.

Figure 2:
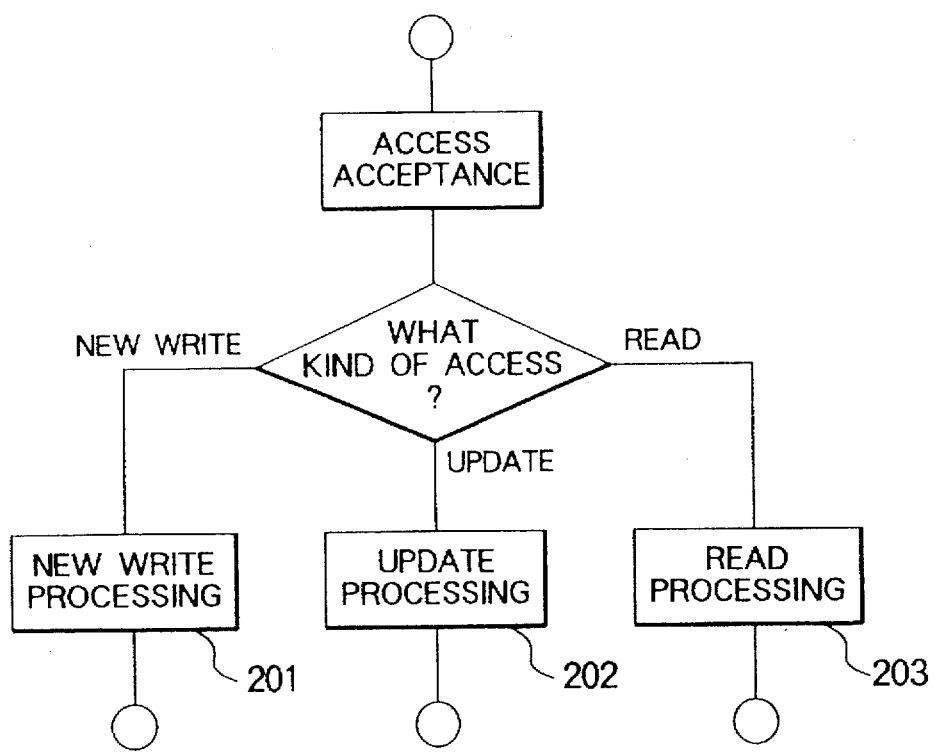
FIG. 2 is a flowchart showing a processing flow of an access controller in the disk apparatus according to the embodiment of the present invention.

(2) Operation of apparatus:

(2-1) Operation of access controller 105:

The access request from the host apparatus is transmitted to the access controller 105 through the high order I/F 103. The access controller 105 executes different kinds of processings depending on the kind of accesses, as shown in FIG. 2. The three kinds of accesses include new write, update and read.

The access processing in the access controller 105 is started when the access request is first transmitted to the cache controller 109. When an access to the drive group 111 is necessary (the new write, update and read when read data do not exist on the cache 110), the cache controller 109 transmits the access request (inclusive of the kind of the access) and the access destination drive group number to the access I/F 107. The access I/F 107 transmits the access destination drive group number to the access destination inspection unit 120 inside the access destination allocation processor 118. Further, the access I/F 107 transmits the access kind of read/write to the data signal generation circuit 115 in the access destination allocation processor 118. When access permission for control/data is issued as a result of arbitration by the access destination allocation processor 118, the access I/F 107 receives this signal. The access I/F 107 reacts with the access permission for control, and executes the exchange of the control signal with the drive group 111, which results from the access request, through the connection switch 116 for control and through the low order I/F 104 corresponding to the access destination drive group 111. On the other hand, the access permission for data is transmitted from the access I/F 107 to the cache controller 109, and the cache controller 109 reacts with this signal and executes the exchange of the data with the drive group 111 through the connection switch 117 for data and through the low order I/F 104 corresponding to the access destination drive group 111.

Figure 3:
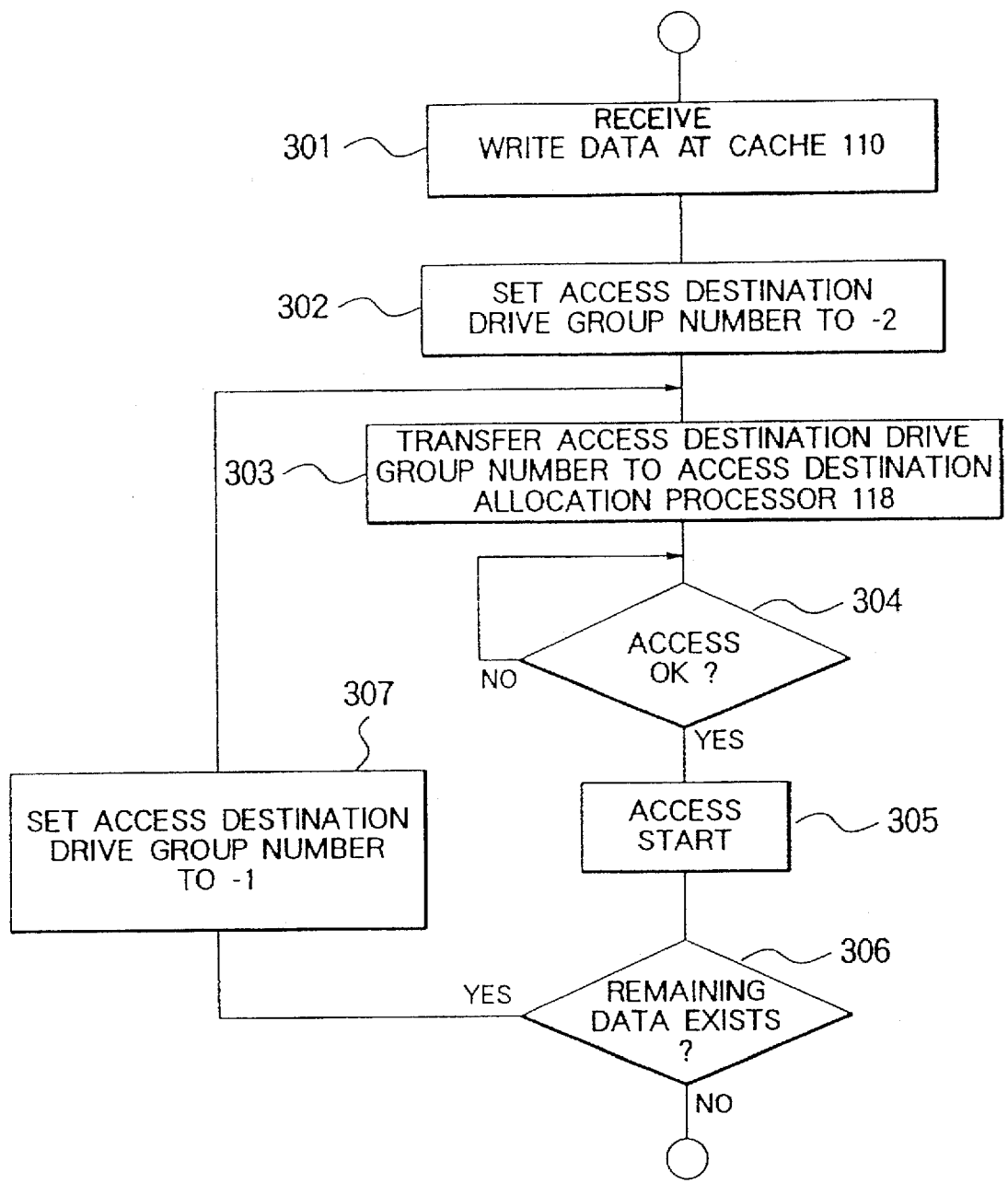
FIG. 3 is a flowchart showing a processing flow for new write processing in the access controller of the disk apparatus according to the embodiment of the present invention.
Figure 4:
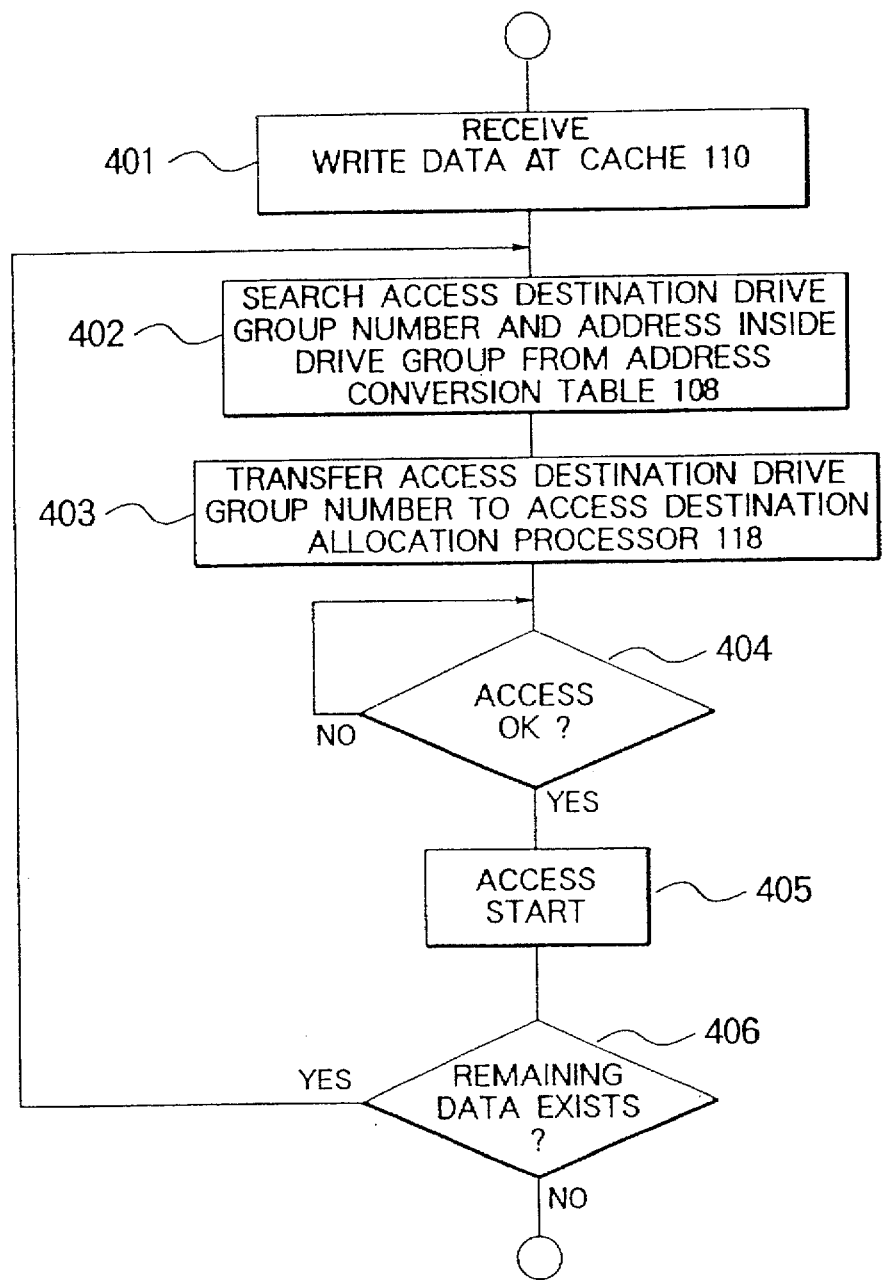
FIG. 4 is a flowchart showing a processing flow for data update in the access controller of the disk apparatus according to the embodiment of the present invention.
Figure 5:
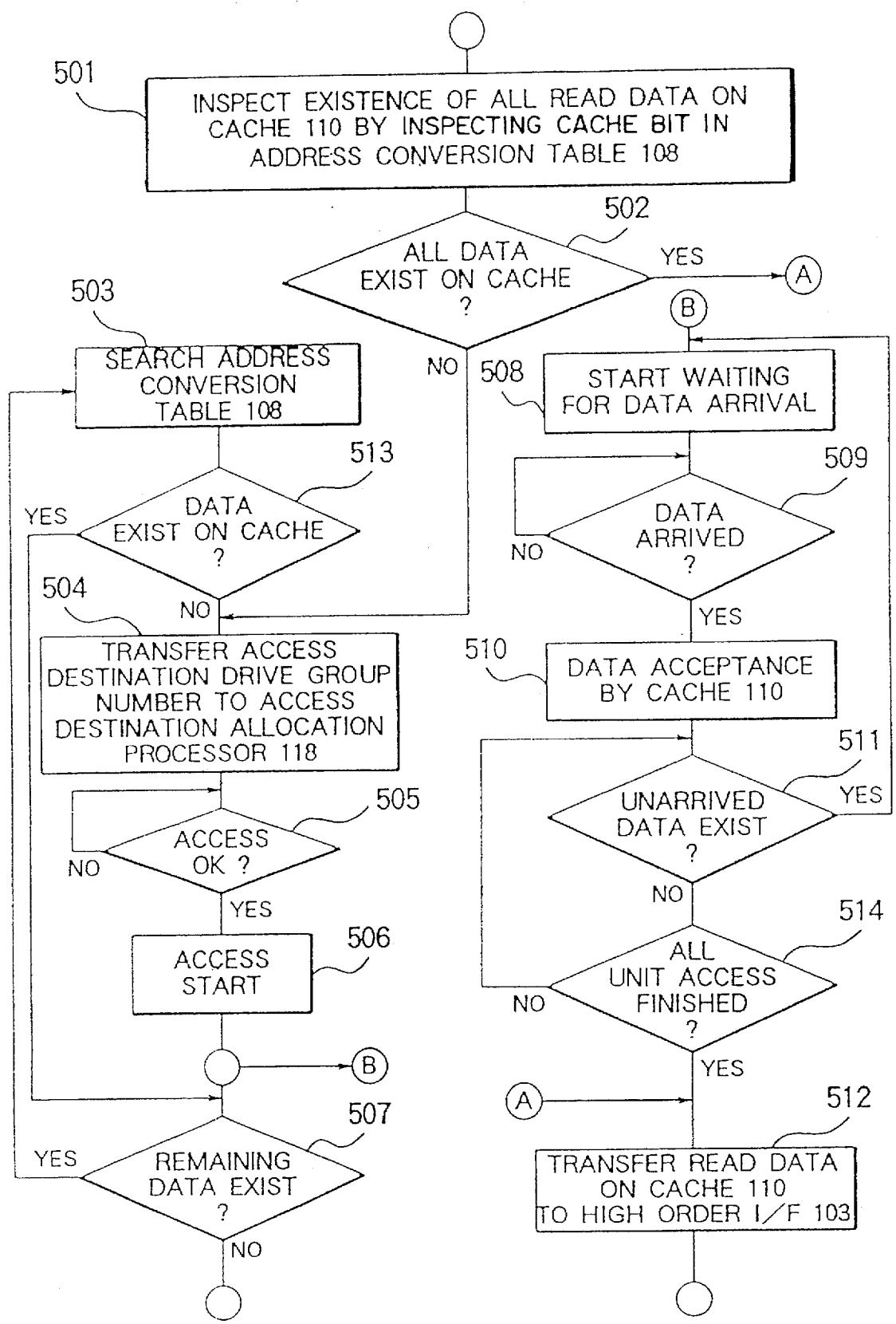
FIG. 5 is a flowchart showing a processing flow for data read in the access controller of the disk apparatus according to the embodiment of the present invention.

Next, the processing of the access controller 105 for each of the access kinds will be explained with reference to FIGS. 3, 4 and 5.

(2-1-1) New write processing:

The operation of the access controller 105 at the time of the new write processing will be explained with reference to FIG. 3.

Receiving the new write request, the cache controller 109 receives the write data at the cache 110 through the high order I/F 103 (step 301). Next, the access destination drive group number is set to a value (−2, for example) representing the leading data of new write (step 302), and the access destination drive group number is transmitted to the access destination allocation processor 118 (step 303). Thereafter, the access controller 105 waits for the access permission from the access destination allocation processor 118 (step 304). Receiving the access permission, the access controller 105 gains access to the drive group 111 which is connected at this point of time by the connection switches 116, 117 (step 305).

When the write data quantity is greater than the quantity which can be handled by the unit access, only the quantity of data which can be handled by the unit access are written into the drive group 111 at the access step 305. The new write processing is subsequently executed for the remaining data (step 306). At this time, the access destination drive group number is set to a value representing the new write data to be subsequently written (−1, for example) (step 307). Thereafter, the processing from the steps 303 to 305 are iterated until the write data no longer exists. Incidentally, because the write destination drive groups 111 are fundamentally different from one another, each of the continuous unit accesses is generated without waiting for the completion of the write operation to the drive group of the preceding unit access. It is the access destination allocation processor 118 that monitors access competition to one drive group 111, and it is the processing step 304 at which the access controller 105 might be affected by the access competition.

At the processing step 305, the new write destination drive group number is transmitted from the access destination allocation processor 118 to the access controller 105. The address inside the drive group is transmitted from the drive group 111 to the access I/F 107 with the start of access. The cache controller 109 generates a new entry (see FIG. 7) for the address conversion table 108 in each unit access on the basis of these data. Furthermore, when a consecutive new write processing is judged as existing at the processing step 306, the number value of the entry for the subsequent unit access is registered to the next entry designation pointer 705 next to this entry. When the consecutive new write processing is not judged as existing at the step 306, the value of the next entry designation pointer 706 next to this entry is set to NULL.

(2-1-2) Update processing:

The operation of the access controller 105 at the time of the update processing will be explained with reference to FIG. 4. Receiving the update request, the cache controller 109 receives the write data at the cache 110 through the high order I/F 103 (step 401). Next, it searches the access destination drive group number 702 and the address 703 inside the drive group from the address conversion table 108 on the basis of the access request (step 402), and transfers the access destination drive group number to the access destination allocation processor 118 (step 403). Thereafter, the access controller 105 waits for the access permission from the access destination allocation processor 118 (step 404). Receiving the access permission, the access controller 105 has access to the drive group 111 connected at that point of time by the connection switches 116, 117 (access start at step 405). When the write data quantity exceeds the quantity which the unit access can handle, the access step 405 writes the data only in the quantity which the unit access can handle, into the drive group 111. The update processing is consecutively conducted for the remaining data. At step 406, it is determined whether there is any remaining data. Thereafter, the process steps 402 to 405 are repeated until the write data no longer exists. Since the write destination drive groups 111 are fundamentally different, each of the continuous unit accesses is generated without waiting for the write completion into the drive group 111 of the preceding unit access. It is the access destination allocation processor 118 that monitors access competition to one drive group 111, and it is the processing step 404 at which the access controller 105 might be affected by this access competition.

(2-1-3) Read processing:

The operation of the access controller 105 at the time of the read processing will be explained with reference to FIG. 5. Receiving the read request, the cache controller 109 inside the access controller 105 searches the logical address for the disk apparatus for which the read request is made, by looking up the address conversion table 108, and inspects the caching bit 704 of the corresponding entry (steps 501 and 502). When the accessed data is not found existing on the cache 110 by this caching bit, access is made to the drive group 111 (steps 504 et seq). When the data desired to be accessed is found existing on the data cache 110 by this caching bit 704, on the contrary, the caching bit 704 of the designated entry is inspected if the link field 706 of this entry represents continuation of the data, and this operation is thereafter repeated until the link field 706 becomes NULL or the data corresponding to a certain entry is not found to exist on the cache (step 502). When this operation is repeated until the link field 706 becomes NULL, all the data relating to this read access are arranged on the cache. Therefore, the data is transferred to the high order I/F 103 (step 512). On the other hand, if any data which does not exist on the cache is found out during this inspection process, access is made to the drive group 111 (step 504 et seq).

When access is gained to the drive group 111, the cache controller 109 acquires the drive group number 702 and the address 703 inside the drive group from the corresponding entry of the address conversion table 108 and transfers the access destination drive group number to the access destination allocation processor 118 (step 504). Thereafter, the access controller 105 waits for the access permission from the access destination allocation processor 118 (step 505). When the access controller 105 receives the access permission, it transfers the address inside the drive group to the drive group 111 connected at that point by the connection switch 116 for control, and raises the read access request (step 506). When the content of the next entry designation pointer 706 next to the entry of the address conversion table 108 from which the access destination drive group number is previously examined is not NULL (i.e., remaining data exists at step 507, the access processing is repeated on the basis of the designated next entry (step 507). In this repetition processing, the caching bit 704 of each entry is examined each time (step 503) and access is made to the drive group 111 only when no data exists on the cache.

The data read out from the drive group 111 by the read access is transferred to the access controller 105 a little after the read access request is generated. Accordingly, the access controller 105 starts the processing of the step 507 after the processing of the step 506 and at the same time, enters the stand-by state to wait for the arrival of the data (step 508). This waiting for data arrival is executed in parallel with acceptance of other accesses and request processings. When a read data arrival signal is transmitted from the access destination allocation processor 118 (step 509), the access controller 105 receives the data from the drive group 111 connected at that point of time by the connection switch 117 for data, registers the data to the cache 110, simultaneously makes the caching bit 704 of the corresponding entry of the address conversion table 108, and registers the address inside the cache storing the data to the address inside the cache field 705 of the same entry.

If arrival of any data is yet to be awaited, as determined in step 511, the steps beginning with step 508 are repeated in the access controller 105. On the other hand, when the data for all the unit accesses are arranged on the cache 110, as determined in step 514, the data are transferred to the host apparatus through the high order I/F 103 (step 512).

(2-2) Operation of access destination allocation processor 118:

The access destination allocation processor 118 accepts the access request by the access destination drive group number from the access controller 105 by the access destination unit 120, and inspects the access destination (step 601).

When the access destination drive group number is "−2", the new write destination decision unit 119 decides the write destination drive group 111 (step 602). To decide the write destination, the drive group use condition management table 106 is looked up, and a usable drive group 111 is allocated.

When the access destination drive group number is "−1", too, the new write destination decision unit 119 decides the write destination drive group 111 (step 603). The write destination drive group number decided at this time is set to a value as the sum of 1 to the write destination drive group number of the unit access just before. (If the drive group number is n, the next value is 1 when the write destination drive group number just before is n).

The access permission unit 121 examines whether or not the access destination drive group number is a positive number at step 601 and whether or not the access destination is usable after steps 602 and 603, and at the same time, confirms that the access controller 105 is not just receiving the result of the unit read access previously generated from the drive group 111. Whether or not the access destination is usable is determined by looking up the drive group use condition management table 106. If access is not possible, this unit access is caused to wait in the access permission unit (step 604). If access is possible, the control signal generation unit 114 transmits the access destination drive group number to the connection switch 116 for control and at the same time, the access permission signal for control is transmitted to the access I/F 107 of the access controller 105 (step 605). If access is permitted for the new write access request by the processing of the step 604, the access destination drive group number at that time is transferred from the access permission unit 121 to the cache controller 109 for the purpose of registration to the address conversion table 108.

Next, the timing at which the signal to the connection switch 117 for data and the access permission signal for data to the access controller 105 are transmitted will be explained. This timing is classified in accordance with the access kind signal transmitted simultaneously to the data signal generation unit 115 when the access request is transmitted from the access controller 105 to the access destination allocation processor 118 (step 606).

When the access is "write access", the data signal, too, is transmitted simultaneously with the control signal (step 607). When the access is "read access", the drive group 111 accepts the access request after the transmission of the control signal, and the data signal is transmitted at the timing at which the read data can be transmitted to the access controller 105 for this request (step 608).

There are two kinds of data signals. One is the signal which is transmitted in the form of the access destination drive group number from the data signal generation unit 115 to the connection switch 117 for data, and the other is the signal which reports the data reception timing from the data signal generation unit 115 to the access I/F 107 inside the access controller 105. When the latter signal is transferred to the access I/F 107 and from hence to the cache controller 109, the processing of step 510 shown in FIG. 5 is started.

Figure 8:
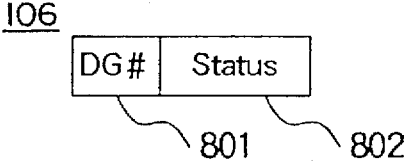
FIG. 8 is a table showing an entry constituting a drive group use condition management table of the disk apparatus according to the embodiment of the present invention.

The drive group use condition management table 106 comprises the entry shown in FIG. 8. Reference numeral 801 in FIG. 8 denotes the drive group number, and 802 denotes the use condition of the drive group 111 corresponding to the drive group number.

When the access permission unit 121 of the access destination allocation processor 118 permits the access to the drive group 111, a status field 802 of the corresponding entry of the drive group use condition management table 106 is set to the content representing the in-use condition. When the processing for the access request is completed by the drive group 111, on the contrary, the status field 802 is set to the content presenting the out-of-use condition.

(2-3) Operation of connection switch:

The connection switch 116 for control and the connection switch 117 for data receive the access destination drive group numbers from the control signal generation unit 114 and the data signal generation unit 115 of the access destination allocation processor 118, respectively, and establish the connection paths between the host apparatus and the drive group 111.

The paths from the high order side (host apparatus side) to the low order side (drive group 111 side) are selected by the access destination drive group number input to a multiplexer 122. On the contrary, the paths from the low order side to the high order side are selected by the access destination drive group number input to the selector 123.

The mode of the overall processings by the disk apparatus according to the present invention is represented by the time chart shown in FIGS. 9A and 9B. FIG. 9A corresponds to a read access. FIG. 9B corresponds to a write access. As can be clearly understood from FIGS. 9A and 9B, since a plurality of drive groups are disposed in the present invention, the access destinations are dispersed and parallel processing for continuous accesses can be made. As a result, the present invention can accomplish efficient disk access.

Generally, there is the case where a single access to the disk apparatus is an elongated access. In this case, the disk apparatus according to the present invention automatically segments this single access into unit accesses a, b and c and distributes them to the drive groups, respectively. Accordingly, efficient processings shown in FIGS. 9A and 9B can be attained. According to the prior art technology, segmentation into the unit accesses a, b and c is made, but since access is gained to only a single drive (drive group), only processing having low efficiency such as shown in FIG. 17 can be made.

Figure 17A:
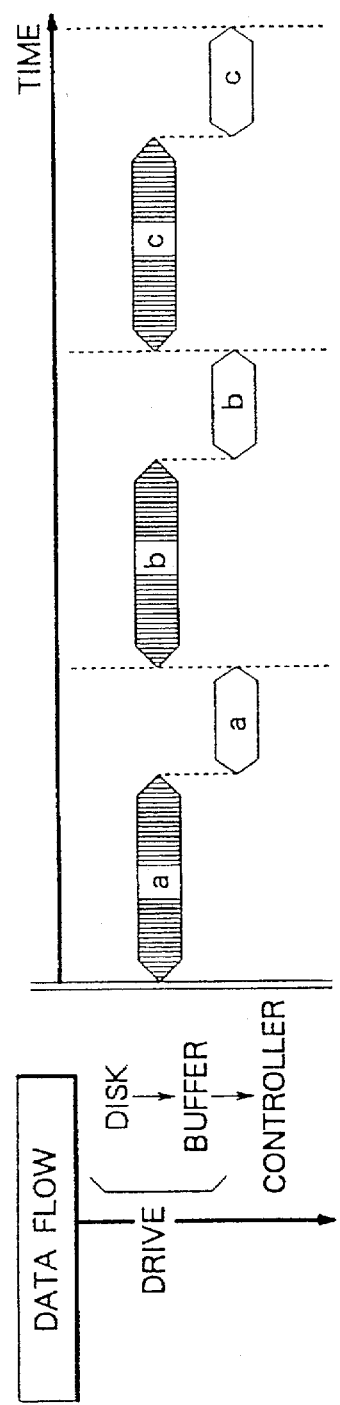
FIGS. 17A and 17B are time charts showing the mode of access processing by a disk apparatus according to the prior art.
Figure 17B:
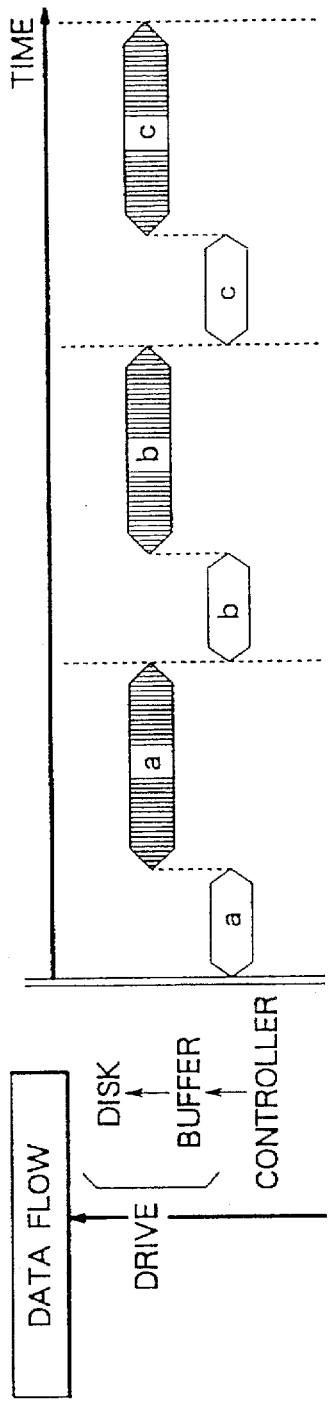

Incidentally, the unit accesses a and c shown in FIGS. 9A and 9B still remain as the accesses to the same drive groups, and are therefore processed sequentially in the same way as the unit accesses a, b and c shown in FIG. 17. However, the present invention can solve this problem by providing a greater number of drive groups. When the degree of multiplexity of the access processing is optimally set by increasing the number of drive groups in this way, a disk apparatus having a shorter access pitch can be constituted.

[Embodiment 2]

Figure 10:
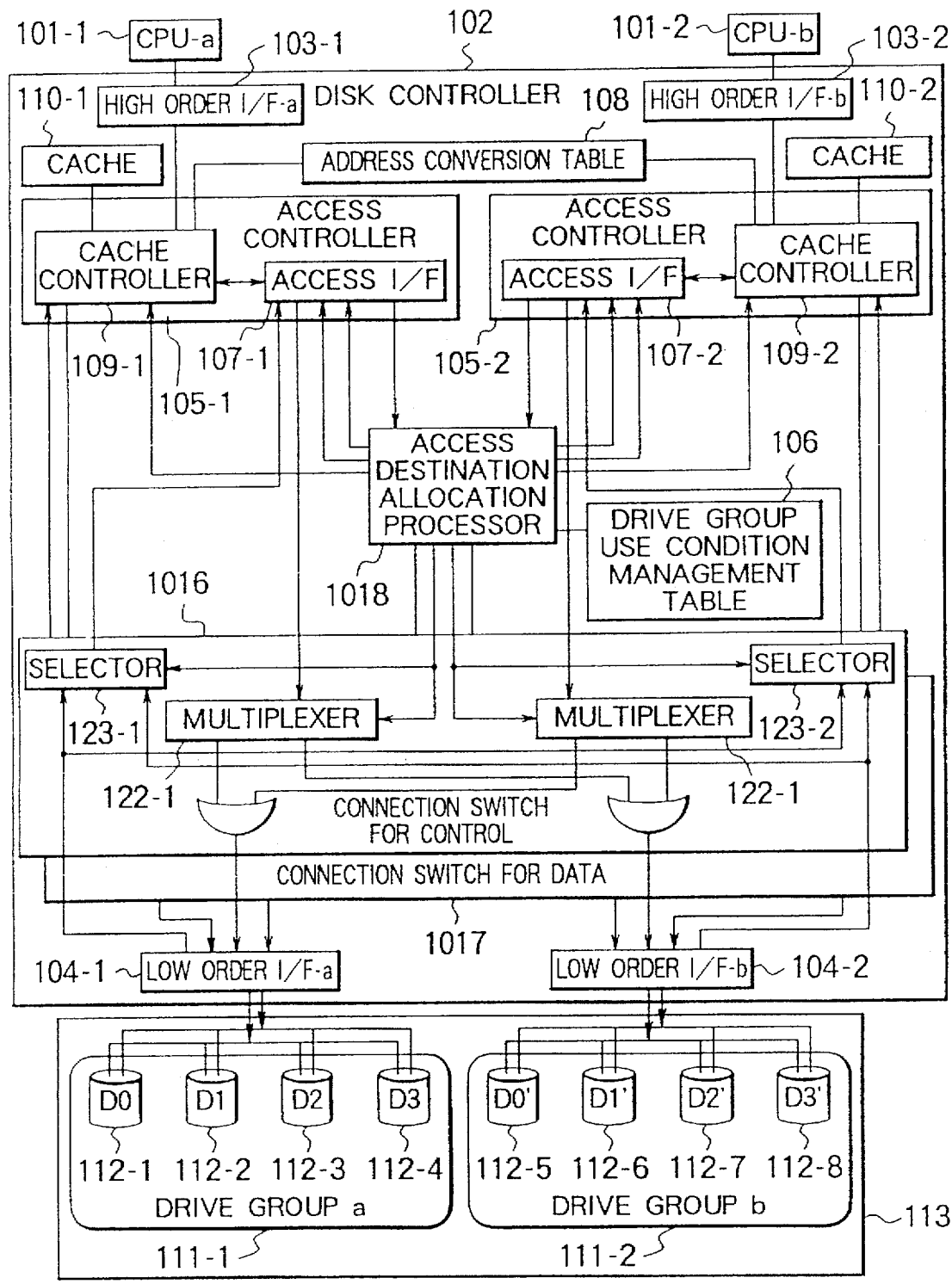
FIG. 10 is a structural view of a multiport disk apparatus according to another embodiment of the present invention.

Next, a multiport disk apparatus according to the second embodiment of the present invention will be explained. FIG. 10 typically illustrates the construction of the multiport disk apparatus according to the present invention. As can be clearly understood by comparing FIG. 10 with FIG. 1, a plurality (two, in this embodiment) of high order I/Fs 103 and access controllers 105 are disposed in this embodiment in order to accomplish multiports, and the construction of each of the access destination allocation processor 1018 and the connection switches 1016, 1017 is different in this embodiment. However, the fundamental constructions of the access destination allocation processor 1018 and the connection switches 1016, 1017 are the same as those of Embodiment 1.

Figure 11:
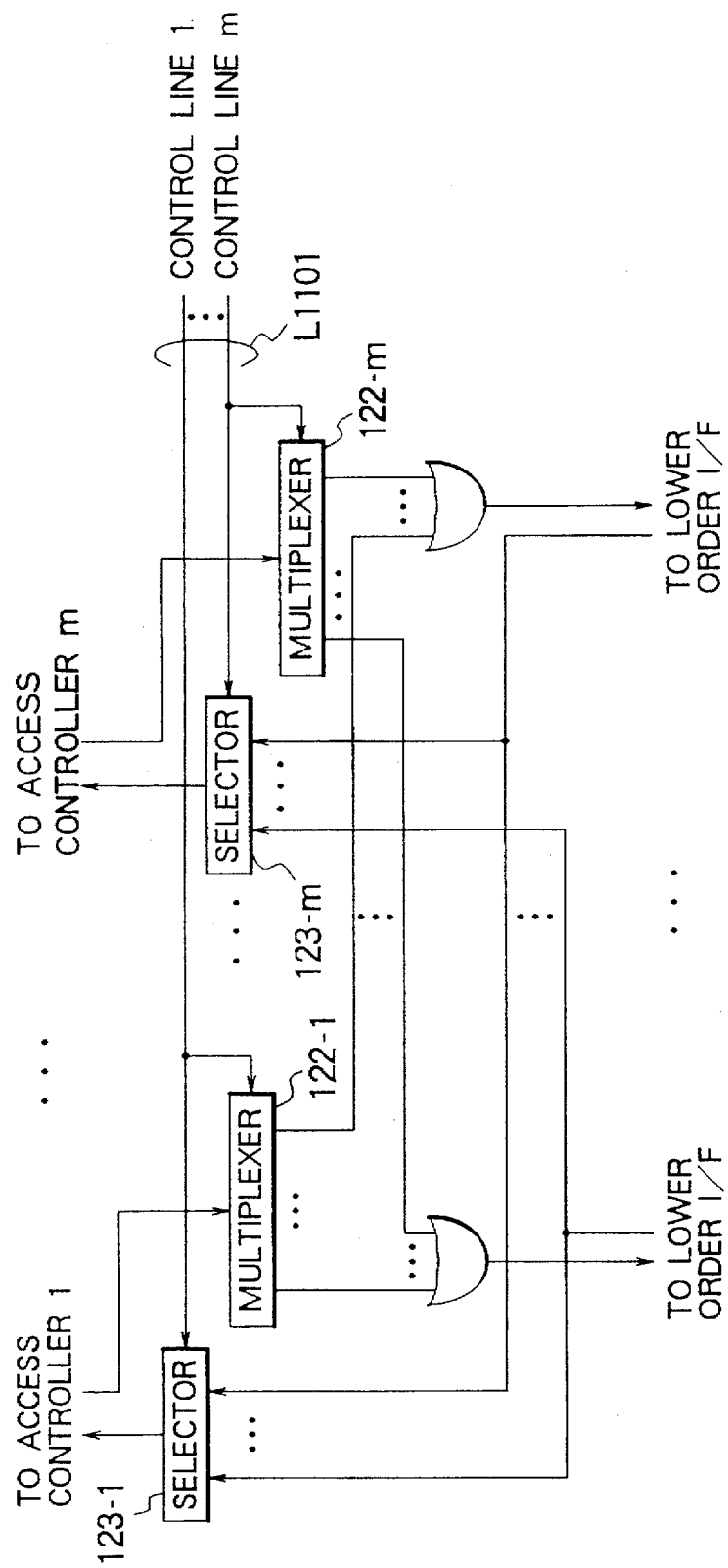
FIG. 11 is a structural view of a connection switch of the multiport disk apparatus described above.

FIG. 11 shows a general construction of the connection switches 1016, 1017. The difference of these switches from the connection switches 116, 117 shown in FIG. 1 is that m connection paths connecting the high order side to the low order side in such a manner as to correspond to the number m of high order side port can exist in this embodiment. To accomplish this feature, a multiplexer 122 and a selector 123 are so disposed as to correspond to each of the high order side ports, and a control line L1101 exists so as to transfer the access destination drive group number on each high order side port. A path select control line to the multiplexer 122 and the selector 123 corresponding to a certain high order side port is one of L1101 as the control lines for that high order side ports.

Figure 12:
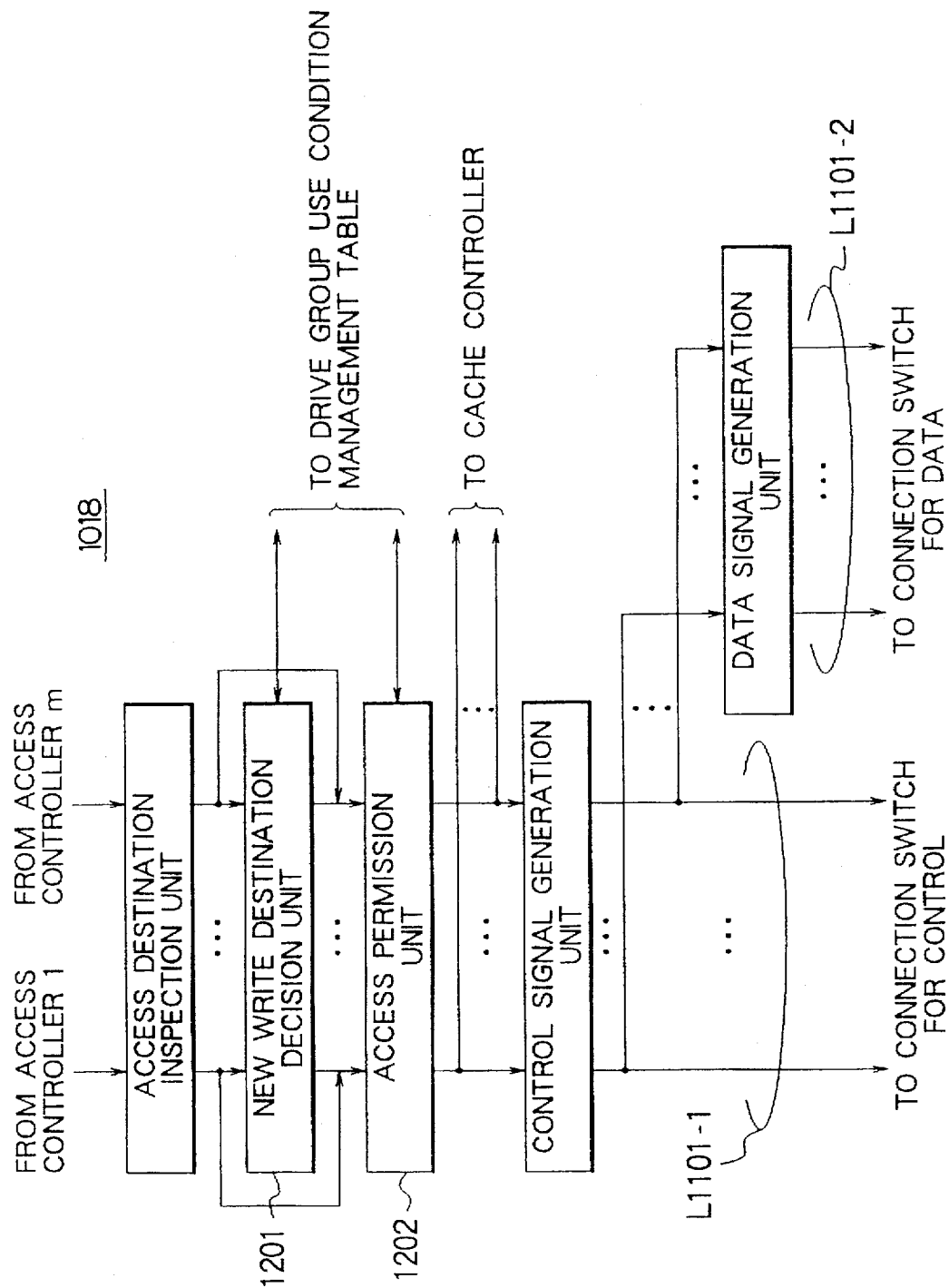
FIG. 12 is a structural view of an access destination allocation processor of the multiport disk apparatus described above.

Next, FIG. 12 shows an ordinary construction example of the access destination allocation processor 1018 according to the present invention. This processor 1018 manages the connection destinations for all the high order side ports.

The constituent elements of this access destination allocation processor 1018 are fundamentally similar to those of the access destination allocation processor 118 described in the first embodiment. However, each constituent element in this embodiment simultaneously executes the processing for the access request from a plurality of high order side ports. In other words, the access request from each high order side is processed independently.

The new write destination decision unit 1201 and the access permission unit 1202 in this embodiment not only look up the drive group use condition management table 106, but also grasp the competition state of the requested access destination drive group numbers due to the simultaneous access requests from a plurality of high order side ports, and solve such a competition by executing priority processing, or the like.

Figure 14:
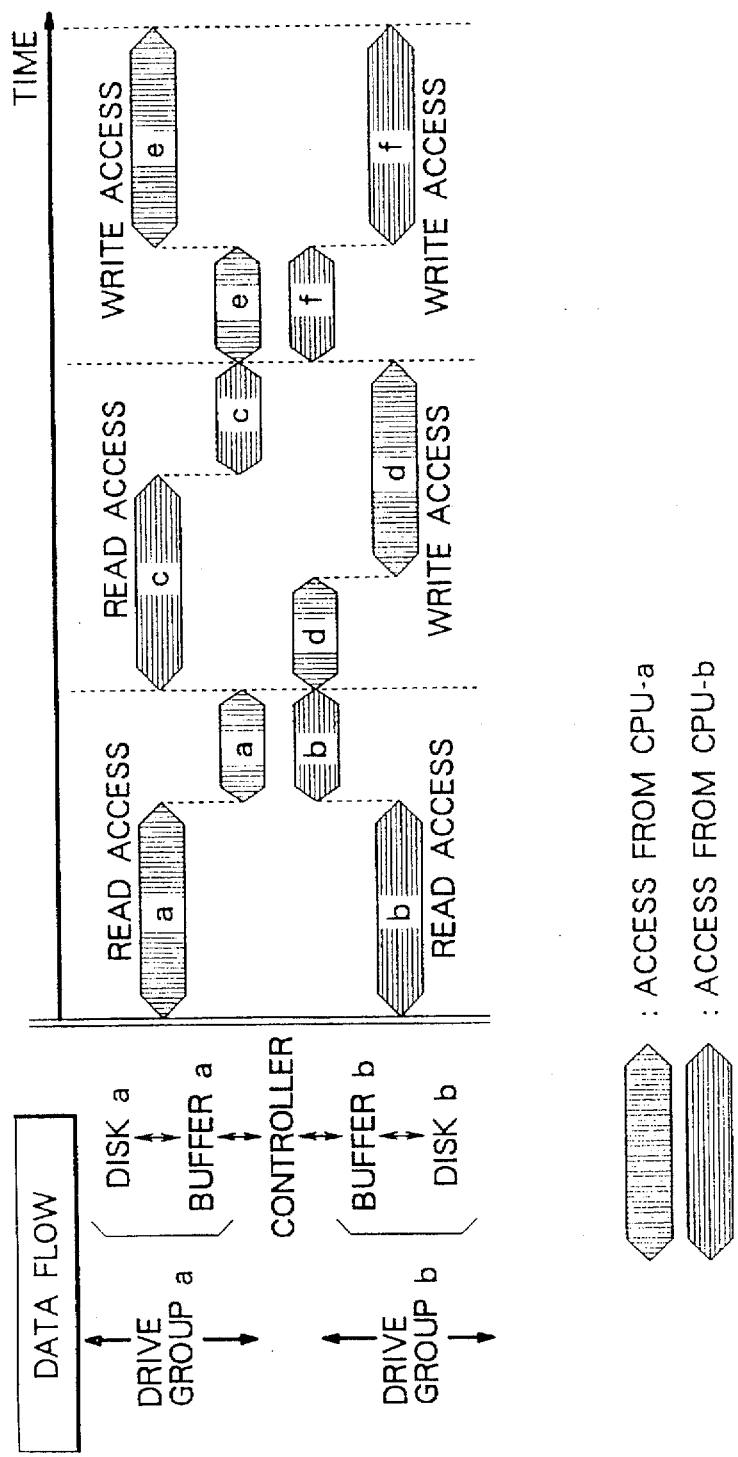
FIG. 14 is a time chart showing the mode of access processing by the multiport disk apparatus according to the present invention shown in FIG. 10.
Figure 20:
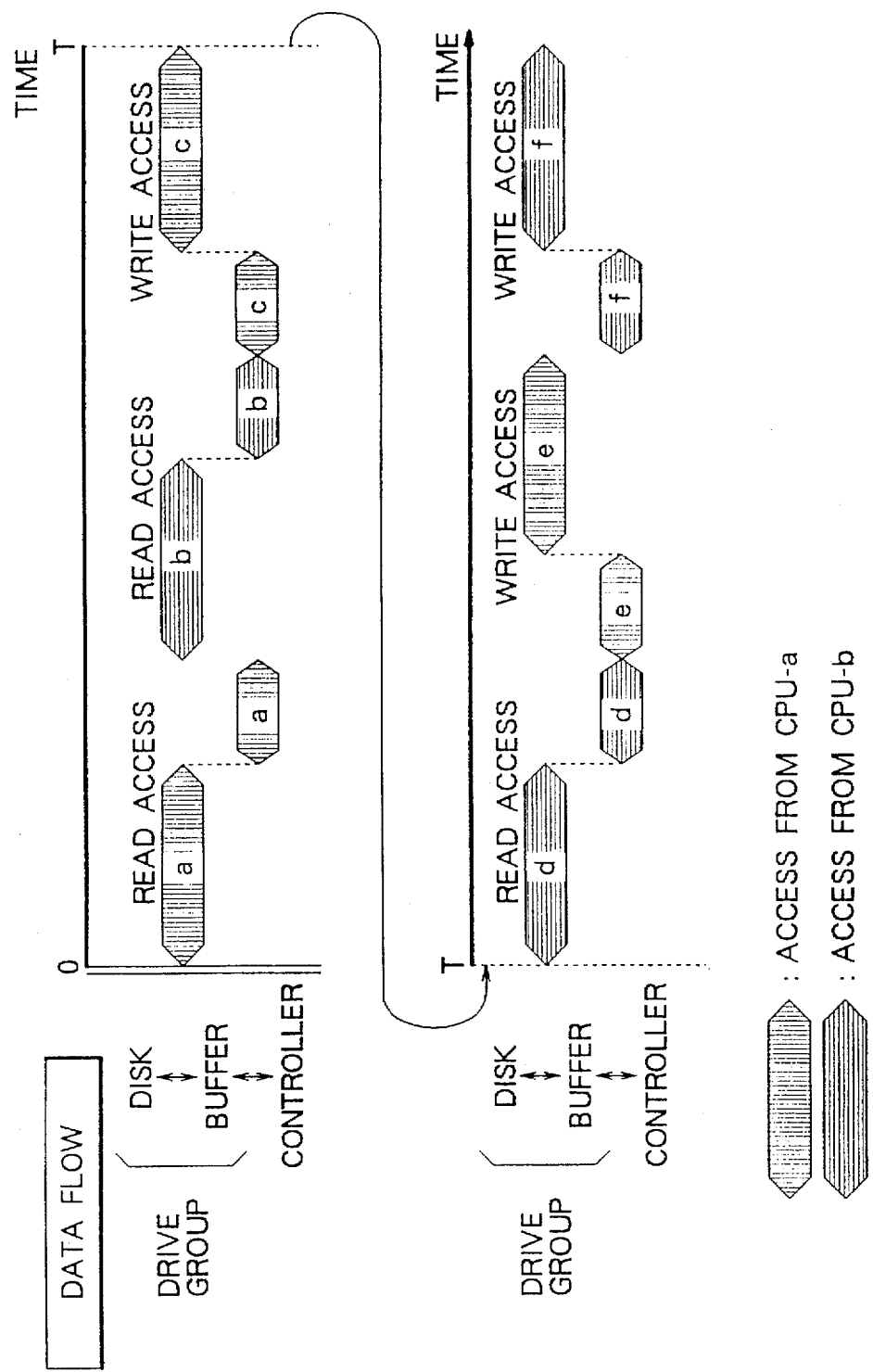
FIG. 20 is a time chart showing the mode of access processing by a disk apparatus according to the prior art.

Next, the effect of simultaneous processing for the access requests from a plurality of high order apparatus, which is brought forth by the present invention, will be explained. The conventional disk apparatus sequentially processes the access requests from a plurality of high order apparatuses as shown in FIG. 20. The disk apparatus according to the present invention distributes the access requests from a plurality of high order apparatuses to a plurality of drive groups and lets these drive groups process them. Accordingly, simultaneous processing of the access requests from a plurality of high order apparatus can be accomplished as shown in FIG. 14, and an efficient processing can be expected.

Figure 18:
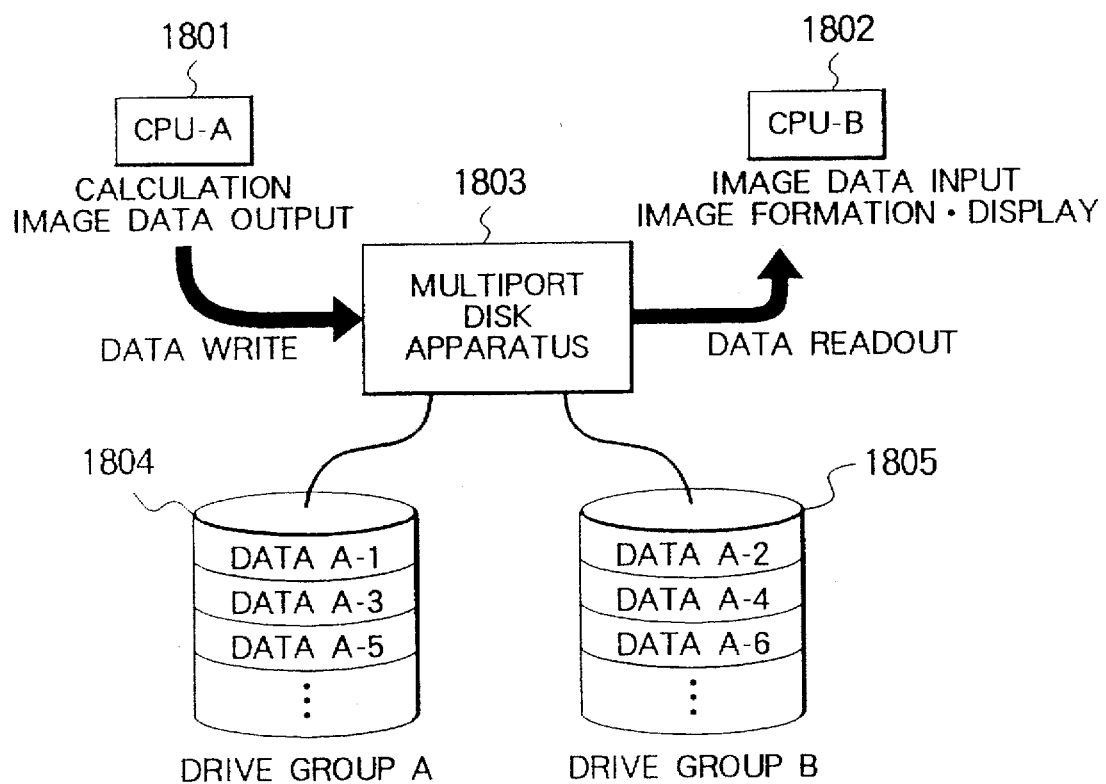
FIG. 18 is a schematic view showing an application example of the present invention to an information processing system.

FIG. 18 shows an application example of a simultaneous processing mechanism for the access requests from a plurality of high order apparatuses. This example relates to a system for accomplishing visualization of calculation result data in scientific application.

A CPU-A (1801) in FIG. 18 executes a molecular dynamics application program, for example, generates the result of calculation as data A in the form of image data, and writes the data A into a disk apparatus 1803. Since the data A is an extremely elongated data in this calculation, the disk apparatus 1803 automatically segments this data A into several small segments (data A-1, data A-2, ..., data A-6, ...) and arranges them dispersedly in arbitrary memory units inside the apparatus. At this time, the dispersed arrangement is accomplished uniformly and in regular sequence for the drive groups A and B. The mode of arrangement is represented by 1804 and 1805. In other words, the data A-1, the data A-2, ..., the data A-6, ... are stored alternately in order named in the drive group A (1804) and in the drive group B (1805). Though this drive group 1804, 1805 is conceptually represented by one drive, each comprises a plurality of drives in some cases.

Figure 19:
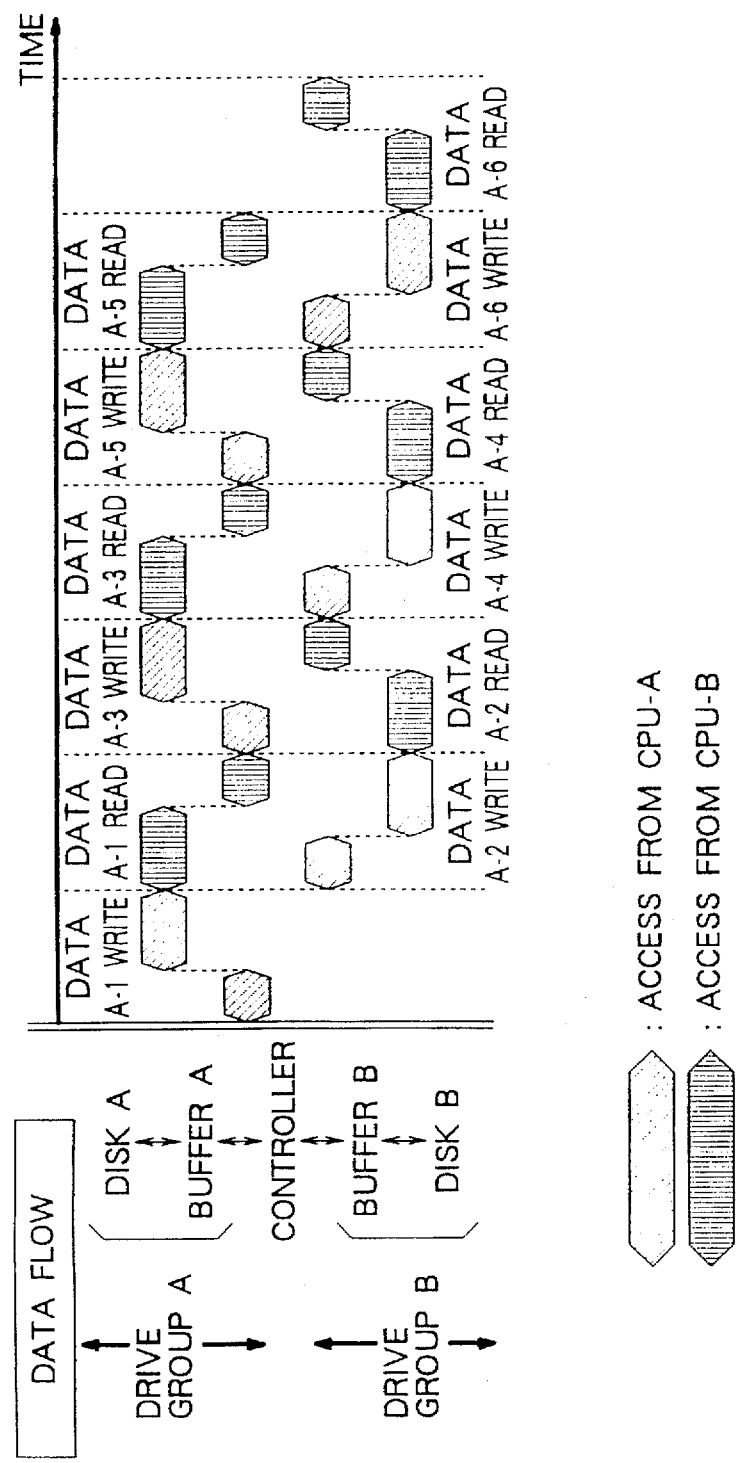
FIG. 19 is a time chart showing the mode of processing by a multiport disk apparatus according to the present invention in the application example shown in FIG. 18.

On the other hand, a CPU-B (1802) reads the image data A generated by the CPU-A (1801) from the disk apparatus 1803, forms the images and displays them. By the way, this image visualization is used also for confirming correctness of the calculation principle (setting of parameters for the calculation, etc.) by the CPU-A (1801), and for such a purpose, image generation described above can be preferably carried out as quickly as possible. It would be extremely efficient and ideal if the CPU-B (1802) can read the data A in parallel with the generation of the data A and write of the data A by the CPU-A (1801) into the disk apparatus 1803. The present invention can provide such a form of utilization. The processing operation of the disk apparatus according to the present invention in the example shown in FIG. 18 is illustrated in FIG. 19.

If the numbers of the high order side ports and the drive groups 111 are drastically increased, the disk apparatus of this embodiment can be one application of a disk system in a massively parallel processor. In this disk apparatus, it is some, or all, of the processors constituting the massively parallel processor that are connected to the high order side ports. The connection switch at this time is not a simple switch such as the one shown in FIG. 11, but is in some cases a large scale crossbar switch or a coupled network by the application of networks between constituent elements of various parallel processors.

Figure 21:
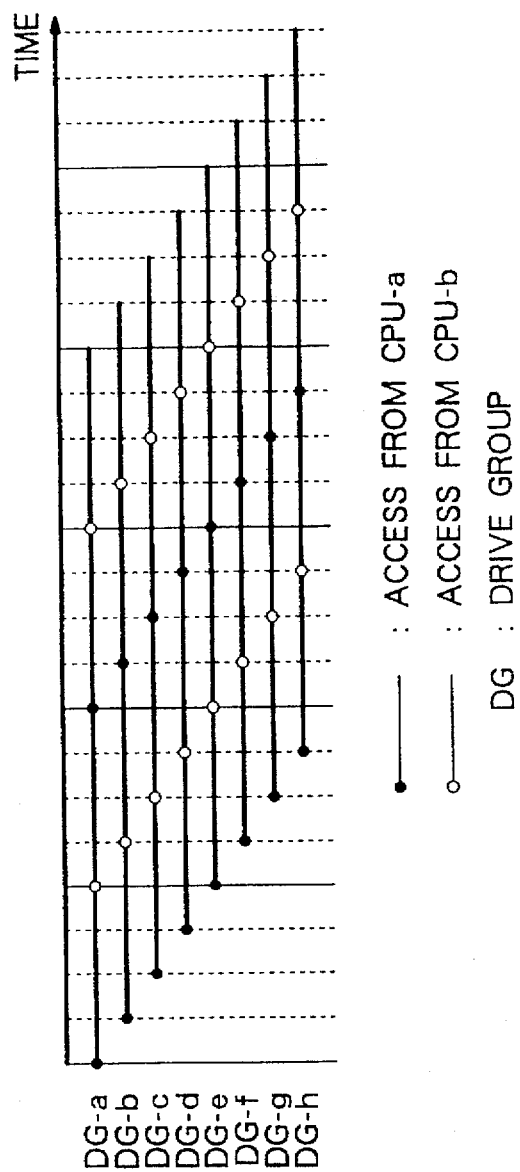
FIG. 21 is a time chart showing the mode of access processing by a multiport disk apparatus according to another embodiment of the present invention.

When a sufficiently large number of drive groups are prepared, the disk apparatus of this embodiment can accomplish simultaneous processing for the access requests from a plurality of high order apparatuses and moreover, can reduce the respective access pitches. As shown in FIG. 21, for example, when eight drive groups are prepared, the accesses from the individual high order apparatuses are quadruplely multiplexed to shorten the access pitches and furthermore, the accesses from two high order apparatuses (CPUs) can be simultaneously processed.

To accomplish the object of an ultra-large scale data base, this disk system prepares a plurality of disk apparatuses and collectively uses them. In comparison with the disk system for dispersedly managing the data, data management becomes easier and hence, the disk system of this embodiment is superior. The ease and improvement of the data management in the multiport disk apparatus of this embodiment results from the fact that this disk apparatus is essentially one apparatus.

[Embodiment 3]

The case where the access destination allocation control by the disk apparatus according to the present invention is accomplished by time management will be explained as the third embodiment of the invention.

In the disk apparatus of this embodiment, the timing of access permission by the access destination allocation processor (118, 1018) occurs in every predetermined time which is managed by a timer in the access destination allocation processor. When this disk apparatus is the multiport disk apparatus described in the second embodiment, the access permission can be simultaneously generated for each of the high order side ports at the timing of this predetermined time.

In the disk apparatus of this embodiment, the access destination allocation processor manages the use condition of each drive group 111 by its timer. Accordingly, the information exchange between each drive group and the access destination allocation processor for grasping the use condition of each drive group 111 becomes unnecessary, the overhead for such an information exchange can be eliminated, and a circuit necessary for the control can be simplified.

The interval of the access permission timing by the accessed destination allocation processor in this embodiment is the access pitch of the disk apparatus of this embodiment. This time interval is also the time management unit in the access destination allocation processor.

Figure 13:
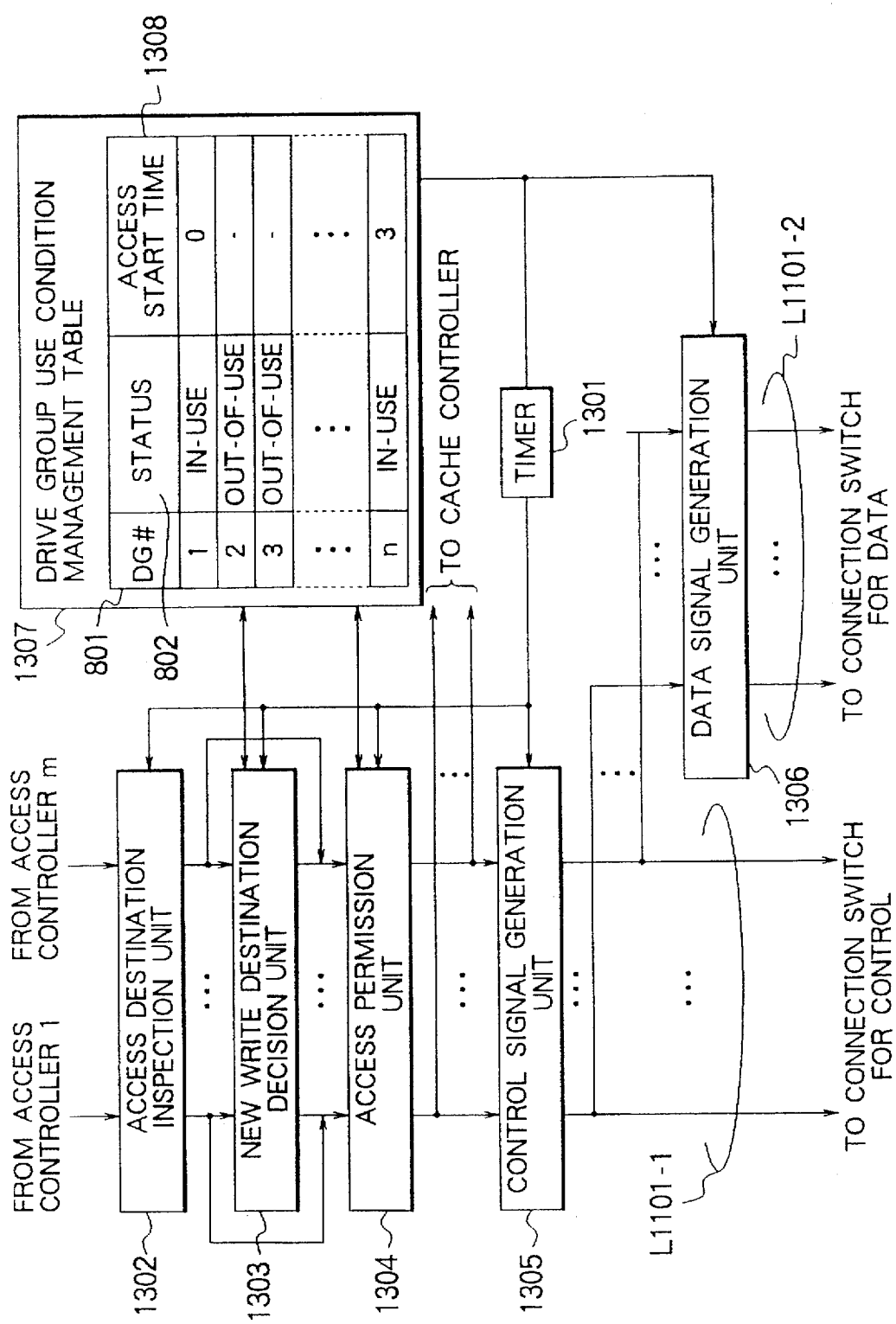
FIG. 13 is a structural view of an access destination allocation processor in accordance with a time management system in the disk apparatus according to the embodiment of the present invention.

FIG. 13 shows the access destination allocation processor and the drive group use condition management table in this embodiment. The access destination allocation processor of this embodiment starts decoding the access request when the timer 1301 applies the access timing in every predetermined time to the access destination inspection unit 1302. A series of other processings in the access destination allocation processor are the same as those of the foregoing embodiments.

On the other hand, the drive group use condition management table 1307 in this embodiment includes a field 1308 representing the access start time in addition to the fields that are assumed in the foregoing embodiments. The value of this field is given by the timer 1301. When the access is permitted by the access permission unit 1304, a status field 802 of the entry corresponding to the drive group 111, to which access is permitted, is set to the content representing the in-use state and at the same time, the value of the timer 1301 at this time is set to the access start time field 1308.

The timing at which the content of the status field 802 is set to the content representing the out-of-use state is the timing of transmission of the access processing end signal which is irregularly transmitted from the drive group 111 in the foregoing embodiment. In this embodiment, however, this timing is the timing of the predetermined time which is managed by the timer 1301.

The access destination allocation processor compares the content of the access start time field 1308 of each entry of the drive group use condition management table with the value of the timer 1301 at the update timing described above, and when the completion of the access is time-wise guaranteed, the processor sets the status field 802 to the content representing the out-of-use condition. Incidentally, the guarantee that the access is time-wise completed can be obtained when the access destination allocation processor grasps the maximum time necessary for the unit access. Accordingly, in the disk apparatus of this embodiment, the interval in which the access request is made to one drive group 111 is not shorter than the maximum access time necessary for the unit access.

Figure 6:
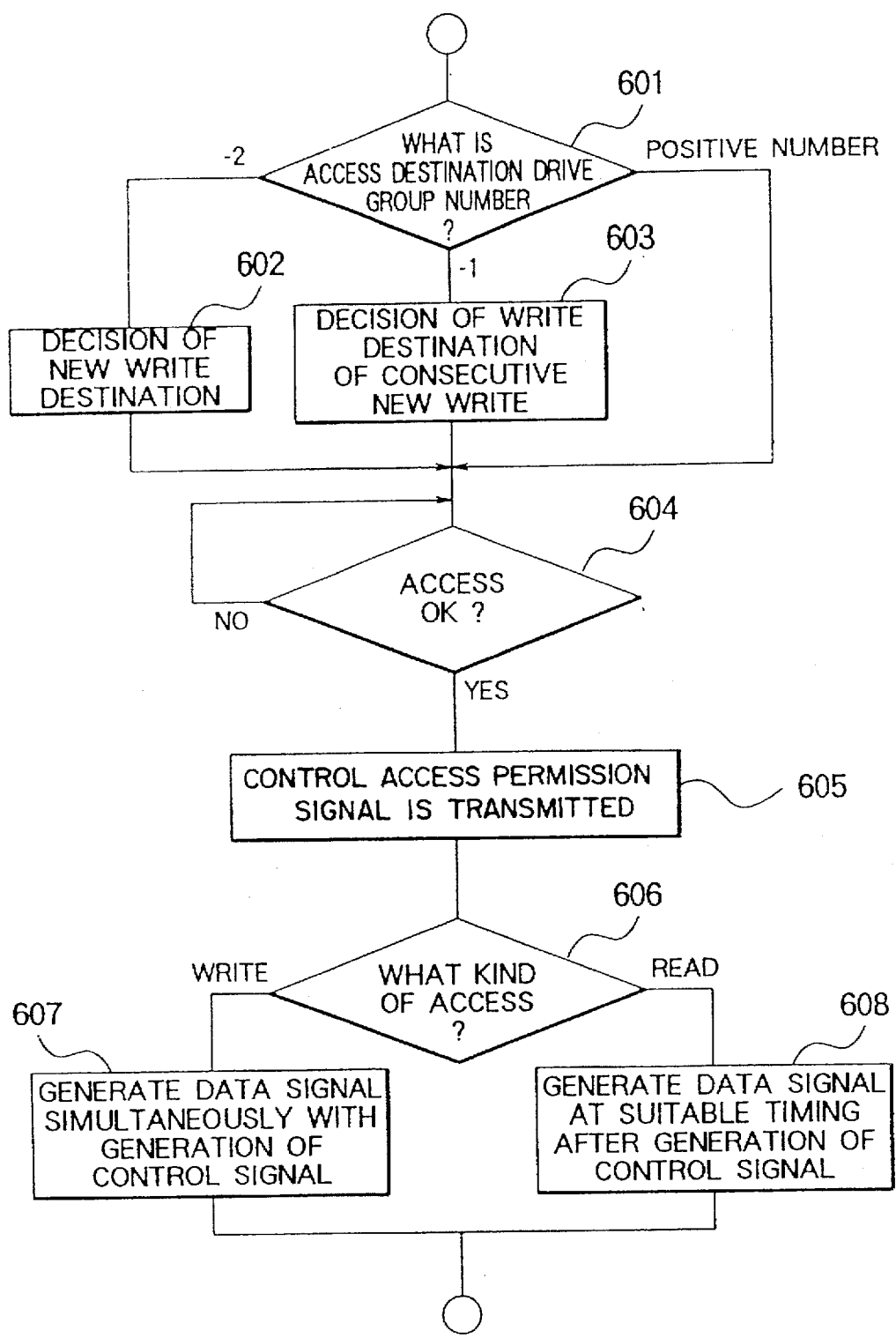
FIG. 6 is a flowchart showing a processing flow of an access destination allocation processor of the disk apparatus according to the embodiment of the present invention.

In the disk apparatus according to this embodiment, the access destination allocation processor also controls the timing at which the result of the read access is transmitted from the drive group 111 to the access controller 105. The access destination allocation processor grasps the maximum access time necessary for the unit access and at the same time, grasps the time in which the data transfer from the drive group 111 to the access controller 105 becomes possible at the time of the unit access of read, and reflects this timing on the processing 608 shown in FIG. 6.

According to the present invention described above, a large number of drives are disposed inside the disk apparatus, these drives are grouped to form a plurality of drive groups, and the accesses are allocated to these drive groups. In this way, the high speed operation of the disk apparatus can be accomplished in the form of the reduction of the access pitch, and a multiport disk apparatus can be accomplished, too. Time division multiplex control is employed for this access allocation control, and this control can be therefore accomplished by a relatively simple hardware. The disk apparatus according to the present invention provides its effects particularly for read/write of elongated data.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A disk access method in a disk apparatus, wherein a disk controller is connected to a plurality of drives each having a plurality of memory disks, said method comprising the steps of:

grouping a plurality of said drives into a plurality of drive groups;

dividing a data set into a plurality of partial data each having a data quantity processible at one time by each of said drive groups when an access request is generated from an external apparatus to said disk apparatus so as to write said plurality of partial data of said data set into said drives;

writing a plurality of said partial data into a plurality of said drive groups in a dispersed manner, wherein at least two partial data are written into different drive groups at different times, and successive partial data are written into different drive groups; and reading out a plurality of said partial data forming a designated data set among the data sets stored in a dispersed manner in a plurality of drive groups when an access request for reading out said designated data set is generated from said external apparatus to said disk apparatus, wherein said writing step and said reading step are executed by parallel processing in a plurality of said drive groups by sequentially issuing access requests to said plurality of said drive groups and starting processing to a present access request before completion of processing of a previous access request.

2. A disk access method according to claim 1, wherein a plurality of access requests are sequentially issued to said plurality of said drive groups for multiprocessing at intervals of a predetermined time.

3. A disk access method according to claim 1, wherein when a plurality of access requests are generated from a plurality of said external apparatuses to a plurality of said different drive groups, a plurality of write and/or read steps are carried out in parallel in accordance with a plurality of said access requests.

4. A disk access method according to claim 3, wherein a plurality of access requests are sequentially issued to said plurality of said drive groups for multiprocessing at intervals of a predetermined time.

5. A disk access method in a disk apparatus having a plurality of memory disks and a disk controller connected to said memory disks, said method comprising the steps of:

grouping a plurality of said memory disks into a plurality of drive groups;

dividing a data set into a plurality of partial data each having a data quantity which is capable of being processed at one time by each of said drive groups when data are received from an external apparatus connected to said disk controller;

transferring said plurality of partial data to said drive groups; and writing said partial data into said memory disks in said drive groups, wherein said transferring step is executed in parallel with said writing step.

6. A disk access method according to claim 5, wherein a plurality of said partial data are written into said memory disks at different times, and two successive partial data are transferred to different drive groups.

7. A disk access method according to claim 5, wherein said partial data in said transferring step and said writing step are sequential data.

8. A disk access method according to claim 7, wherein the drive groups to which said partial data is transferred in said transferring step are different from the drive groups to which said writing step is executed.

9. A disk access method according to claim 8, wherein said partial data in said transferring step and said writing step are sequential data.

10. A disk access method according to claim 8, wherein, in said transferring step, said partial data are sequentially transferred to said plurality of drive groups at successive intervals of a predetermined time.

* * * * *